United States Patent
Samal

(10) Patent No.: US 11,263,564 B2
(45) Date of Patent: Mar. 1, 2022

(54) MOBILE SERVICE ROBOTS SCHEDULING UTILIZING MERGED TASKS

(71) Applicant: Samsung Electronics Co., Ltd., Suwon-si (KR)

(72) Inventor: Ranjan Kumar Samal, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 85 days.

(21) Appl. No.: 16/793,654

(22) Filed: Feb. 18, 2020

(65) Prior Publication Data
US 2020/0272977 A1    Aug. 27, 2020

(30) Foreign Application Priority Data
Feb. 21, 2019  (KR) .................. 10-2019-0020761

(51) Int. Cl.
*G06Q 10/06*      (2012.01)
(52) U.S. Cl.
CPC .  *G06Q 10/063114* (2013.01); *G06Q 10/0633* (2013.01)
(58) Field of Classification Search
CPC ............... G06Q 10/06; G06Q 10/0631; G06Q 10/0633; G06Q 90/20
See application file for complete search history.

(56) References Cited

U.S. PATENT DOCUMENTS

| 7,463,948 | B2 | 12/2008 | Orita |
| 7,617,230 | B2 | 11/2009 | Srivastava |
| 8,027,750 | B2 | 9/2011 | Orita et al. |
| 8,285,417 | B2 * | 10/2012 | Kawaguchi ......... G05D 1/0217 700/248 |
| 8,392,921 | B2 | 3/2013 | Song et al. |
| 8,984,069 | B2 | 3/2015 | Ax et al. |

(Continued)

FOREIGN PATENT DOCUMENTS

| KR | 10-2010-0070474 A1 | 6/2010 |
| WO | 01/46884 A2 | 6/2001 |

OTHER PUBLICATIONS

Garcia-Olaya, Angel et al., The 2011 International Planning Competition—Description of Participating Planners The Seventh International Planning Competition, Jun. 2011 (Year: 2011).*

(Continued)

*Primary Examiner* — Scott L Jarrett
(74) *Attorney, Agent, or Firm* — Jefferson IP Law, LLP

(57) ABSTRACT

An electronic device is provided. The electronic device includes a housing, a user interface, a battery positioned inside the housing, a driving unit disposed at the housing or connected to the housing to move the housing, at least one sensor positioned at the housing or inside the housing, a wireless communication circuit positioned inside the housing, a processor operatively connected to the user interface, the driving unit, the at least one sensor, and the wireless communication circuit, and a memory operatively connected to the processor. The processor determines one sequence performed by connecting or merging the first task and the second task, based at least partly on at least one of a type, execution target, execution time, or execution location of the first task and at least one of a type, execution target, execution time, or execution location of the second task.

17 Claims, 13 Drawing Sheets

(56) References Cited

U.S. PATENT DOCUMENTS

| | | | |
|---|---|---|---|
| 9,409,294 B1* | 8/2016 | Shapiro | B25J 9/1664 |
| 9,796,078 B2* | 10/2017 | Angle | G16H 20/13 |
| 9,969,082 B1* | 5/2018 | Berard | B25J 9/1661 |
| 10,632,620 B2 | 4/2020 | Xiong et al. | |
| 2005/0256610 A1* | 11/2005 | Orita | G05D 1/0251 |
| | | | 700/248 |
| 2006/0265103 A1* | 11/2006 | Orita | G05D 1/0278 |
| | | | 700/245 |
| 2007/0027881 A1* | 2/2007 | Srivastava | G06Q 10/06 |
| 2008/0109114 A1 | 5/2008 | Orita et al. | |
| 2008/0256008 A1* | 10/2008 | Kwok | G06N 3/004 |
| | | | 706/20 |
| 2009/0194137 A1* | 8/2009 | Friedman | A47L 11/4061 |
| | | | 134/18 |
| 2009/0319598 A1* | 12/2009 | Mittel | H04L 67/025 |
| | | | 709/202 |
| 2011/0029623 A1 | 2/2011 | Ax et al. | |
| 2011/0154361 A1 | 6/2011 | Song et al. | |
| 2011/0166701 A1* | 7/2011 | Thacher | A01G 25/00 |
| | | | 700/245 |
| 2012/0095619 A1* | 4/2012 | Pack | G05D 1/0038 |
| | | | 701/2 |
| 2012/0136481 A1* | 5/2012 | Maisonnier | B25J 9/1661 |
| | | | 700/257 |
| 2014/0277743 A1* | 9/2014 | Hart | B25J 9/1661 |
| | | | 700/264 |
| 2016/0031082 A1* | 2/2016 | Hazan | B25J 9/1664 |
| | | | 700/250 |
| 2017/0050321 A1* | 2/2017 | Look | G06Q 10/063118 |
| 2017/0361468 A1* | 12/2017 | Cheuvront | G06F 3/16 |
| 2018/0169862 A1* | 6/2018 | Xiong | B25J 9/1664 |
| 2018/0259973 A1* | 9/2018 | Maruo | G05D 1/102 |
| 2018/0326583 A1* | 11/2018 | Baroudi | B25J 9/1661 |
| 2019/0143524 A1* | 5/2019 | Takahashi | B25J 9/161 |
| | | | 700/264 |
| 2019/0391597 A1* | 12/2019 | Dupuis | B25J 9/0084 |

OTHER PUBLICATIONS

Mudrova, Lenka et al., Task Scheduling for Mobile Robots Using Interval Algebra 2015 IEEE Conference on Robotics and Automation, May 2015 (Year: 2015).*

Mudrova, Lenka et al., Partial Order Temporal Plan Merging for Mobile Robot Tasks ECAI 2016 (Year: 2016).*

Mudrova, Lenka, Task Scheduling and Merging in Space and Time University of Birmingham, Jun. 2017 (Year: 2017).*

Coltin, Brian et al., Dynamic User Task Scheduling for Mobile Robots Automated Action Planning for Autonomous Mobile Robots, Papers from the 2011 AAAI Workshop, 2011 (Year: 2011).*

Enka Mudrova et al., "Partial Order Temporal Plan Merging for Mobile Robot Tasks", Publication: ECAI 16: Proceedings of the Twenty-second European Conference on Artificial Intelligence, Aug. 2016, pp. 1537-1545.

International Search Report dated Jun. 10, 2020, issued in International Patent Application No. PCT/KR2020/002325.

* cited by examiner

MOBILE SERVICE ROBOTS SCHEDULING UTILIZING MERGED TASKS

CROSS-REFERENCE TO RELATED APPLICATION(S)

This application is based on and claims priority under 35 U.S.C. § 119(a) of a Korean patent application number 10-2019-0020761, filed on Feb. 21, 2019, in the Korean Intellectual Property Office, the disclosure of which is incorporated by reference herein in its entirety.

BACKGROUND

1. Field

The disclosure relates to a method of managing multi tasks and an electronic device therefor.

2. Description of Related Art

With the development of the technologies associated with an electronic device, various smart devices are being widely used to satisfy the needs of users. Unlike an electronic device simply performing the specified operation in response to a user input, smart devices may analyze various types of user inputs and then may provide intelligent services based on the analyzed input.

As the example of a smart device, various robots have been studied. For example, a robot may operate as a home hub capable of controlling other smart devices, as a smart device. The robot includes various drive units for movement and may be configured to perform various operations using the drive units. For example, the robot may be configured to receive an input from a user, to analyze the input, and to perform the specified task.

The above information is presented as background information only to assist with an understanding of the disclosure. No determination has been made, and no assertion is made, as to whether any of the above might be applicable as prior art with regard to the disclosure.

SUMMARY

When an electronic device such as a robot is used in an environment such as a home, the electronic device may socially interact with a user. For example, the electronic device may be a social robot. In this case, In addition to routine tasks, the electronic device may perform various types of tasks to satisfy the needs of various users. To perform various types of tasks, the electronic device may support multi-modality.

Aspects of the disclosure are to address at least the above-mentioned problems and/or disadvantages and to provide at least the advantages described below. Accordingly, an aspect of the disclosure is to provide a method of managing multi tasks and an electronic device therefor.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a user interface, a battery positioned inside the housing, a driving unit disposed at the housing or connected to the housing to move the housing, at least one sensor positioned at the housing or inside the housing, a wireless communication circuit positioned inside the housing, a processor operatively connected to the user interface, the driving unit, the at least one sensor, and the wireless communication circuit, and a memory operatively connected to the processor. The memory may store instructions that, when executed, cause the processor to receive a first request of a user for performing a first task, to receive a second request of the user for performing a second task different from the first task within a selected time and/or a place in a selected range after receiving the first request, to determine one sequence performed by connecting or merging the first task and the second task, based at least partly on at least one of a type, execution target, execution time, or execution location of the first task and at least one of a type, execution target, execution time, or execution location of the second task, and to perform the first task and the second task based at least partly on the sequence.

In accordance with another aspect of the disclosure, a method for performing a task of an electronic device is provided. The method includes receiving a first request associated with a first task and a second request associated with a second task different from the first task, determining one sequence performed by connecting or merging the first task and the second task, based on at least one of a type, execution target, execution time, or execution location of the first task and at least one of a type, execution target, execution time, or execution location of the second task, and performing the first task and the second task based at least partly on the sequence.

In accordance with another aspect of the disclosure, a system for performing a task is provided. The system includes a housing, a user interface, a battery positioned inside the housing, a driving unit disposed at the housing or connected to the housing to move the housing, at least one sensor positioned at the housing or inside the housing, at least one communication circuit, at least one processor operatively connected to the user interface, the driving unit, the sensor, and the communication circuit, and at least one memory operatively connected to the at least one processor. The memory may store instructions that, when executed, cause the at least one processor to receive a first request of a user for performing a first task, to receive a second request of the user for performing a second task different from the first task after receiving the first request, to determine one sequence performed by connecting or merging the first task and the second task, based at least partly on a type, execution target, execution time, and/or execution location of the first task or a type, execution target, execution time, and/or execution location of the second task, and to perform the first task and the second task based at least partly on the sequence.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
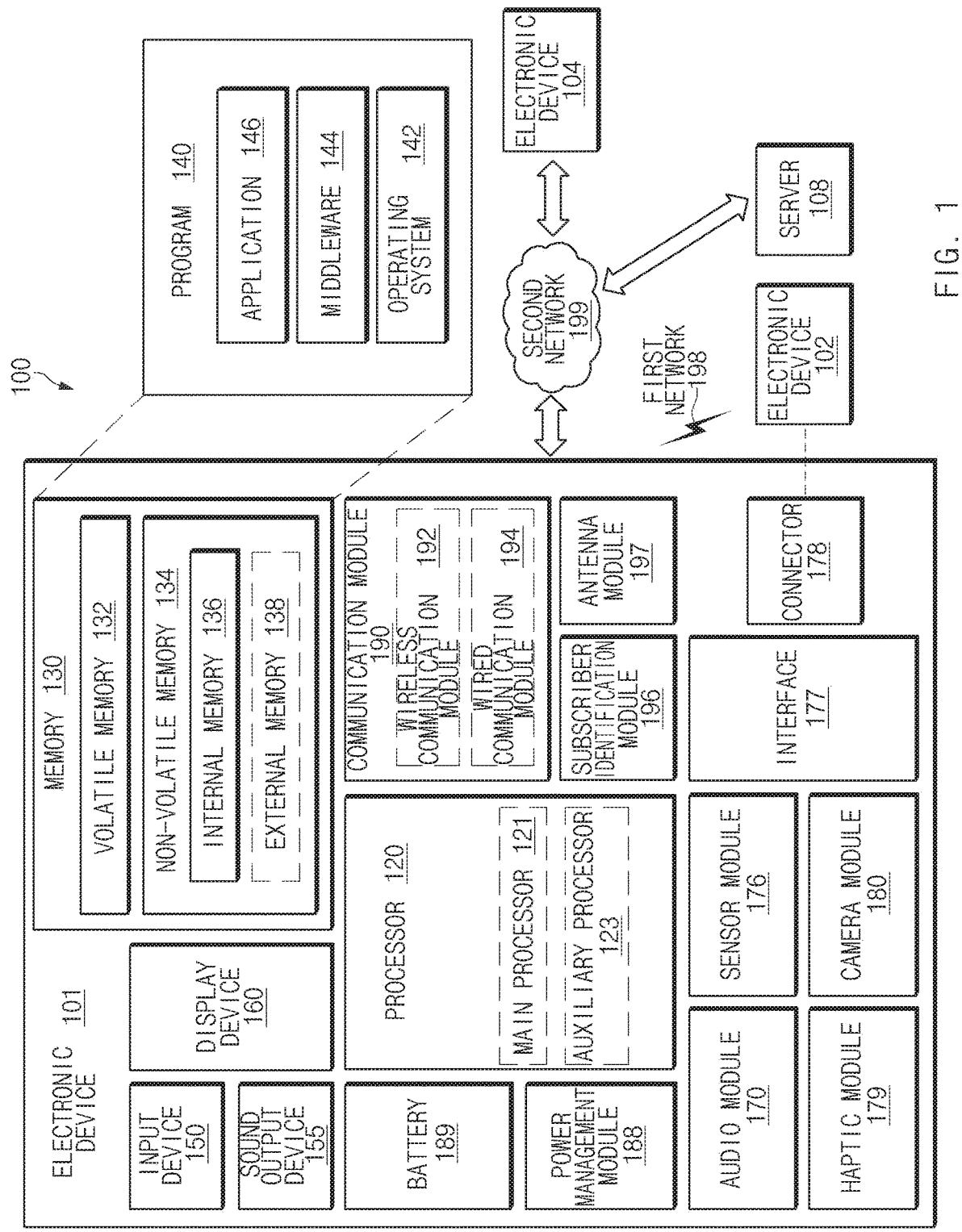
FIG. 1 illustrates a block diagram of an electronic device in a network according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment, a method according to various embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
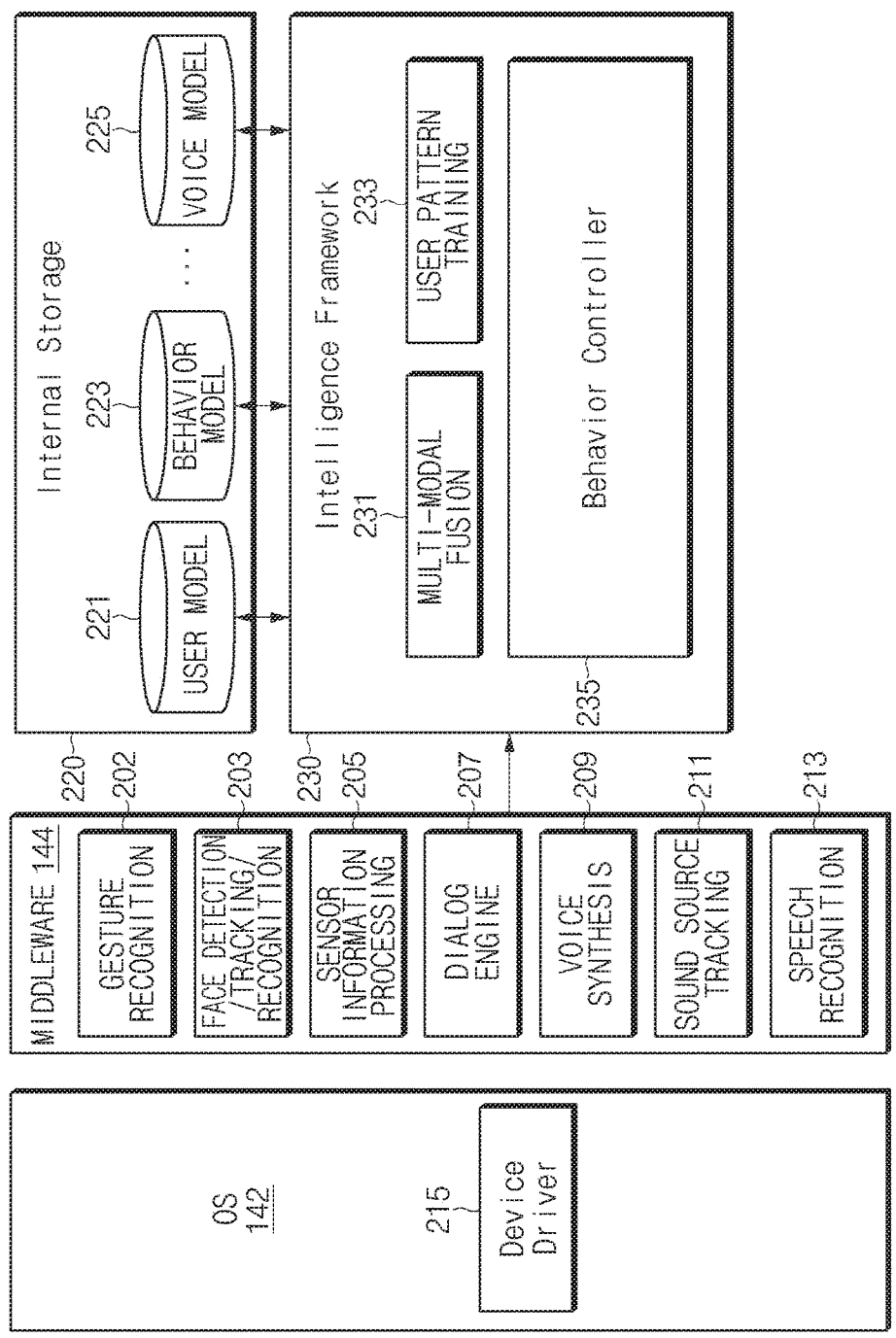
FIG. 2 illustrates a software block diagram according to an embodiment of the disclosure.

FIG. 2 illustrates a software block diagram according to an embodiment of the disclosure.

Referring to FIG. 2, as illustrated in the software block diagram 201, the software of an electronic device (e.g., the electronic device 101 of FIG. 1) may include an operating system (OS) 142 for controlling one or more resources of the electronic device 101, middleware 144, an intelligent framework 230, or internal storage. The OS may include, for example, Android™, iOS™, Windows™, Symbian™, Tizen™, or Bada™. For example, at least part of software programs may be preloaded onto the electronic device 101 when the electronic device is being manufactured; alternatively, when the electronic device is used by a user, at least part of software programs may be downloaded from an external electronic device (e.g., the electronic device 102, the electronic device 104, the server 108 of FIG. 1) or may be updated.

The OS 142 may control the management (e.g., allocating or retrieving) of one or more system resources (e.g., a process, a memory, or a power) of the electronic device 101. Additionally or alternatively, the OS 142 may include one or more driver programs 215 (e.g., the device driver 215) for driving any other hardware devices of the electronic device 101, for example, the input device 150, the sound output device 155, the display device 160, the behavior module 163, the audio module 170, the sensor module 176, the interface 177, the haptic module 179, the camera module 180, the power management module 188, the battery 189, the communication module 190, the subscriber identification module 196, or the antenna module 197 of FIG. 1.

The middleware 144 may provide various additional services in addition to the service provided by the operating system 142. For example, the middleware 144 may detect and track the location of the user's face, using the signal-processed data or may perform authentication through face recognition. The middleware 144 may recognize the 3D gesture of a user, may track the input location (Direct of Arrival (DOA)) for the audio signal, may perform speech recognition, and may process signals of various pieces of sensor data. For example, the middleware 144 may include a gesture recognition manager 202, a face detection/tracking/recognition manager 203, a sensor information processing manager 205, a dialog engine manager 207, a voice synthesis manager 209, a sound source tracking manager 211, and/or a speech recognition manager 213.

For example, the intelligent framework 230 may include a multi-modal fusion block 231, a user pattern training block 233, and/or a behavior control block (behavior controller) 235. For example, the multi-modal fusion block 231 may collect and manage various pieces of information processed by the middleware 144. For example, the user pattern training block 233 may extract and train meaningful information such as a user's life pattern, preference, or the like, using the information of the multi-modal fusion block 231. For example, the behavior control block 235 may represent information to be fed back to the user by the electronic device through movement, graphic user interface (UI)/user experience (UX), light, a voice response, and/or a sound.

For example, the internal storage 220 may include a user model DB 221, a behavior model DB 223, or a voice model DB 225. For example, the user model DB 221 may store information trained by the intelligent framework 230 for each user. For example, the behavior model DB 223 may store information for controlling the behavior of the electronic device. For example, pieces of information stored in each DB may be stored in or shared with a wireless network DB (e.g., cloud).

Figure 3:
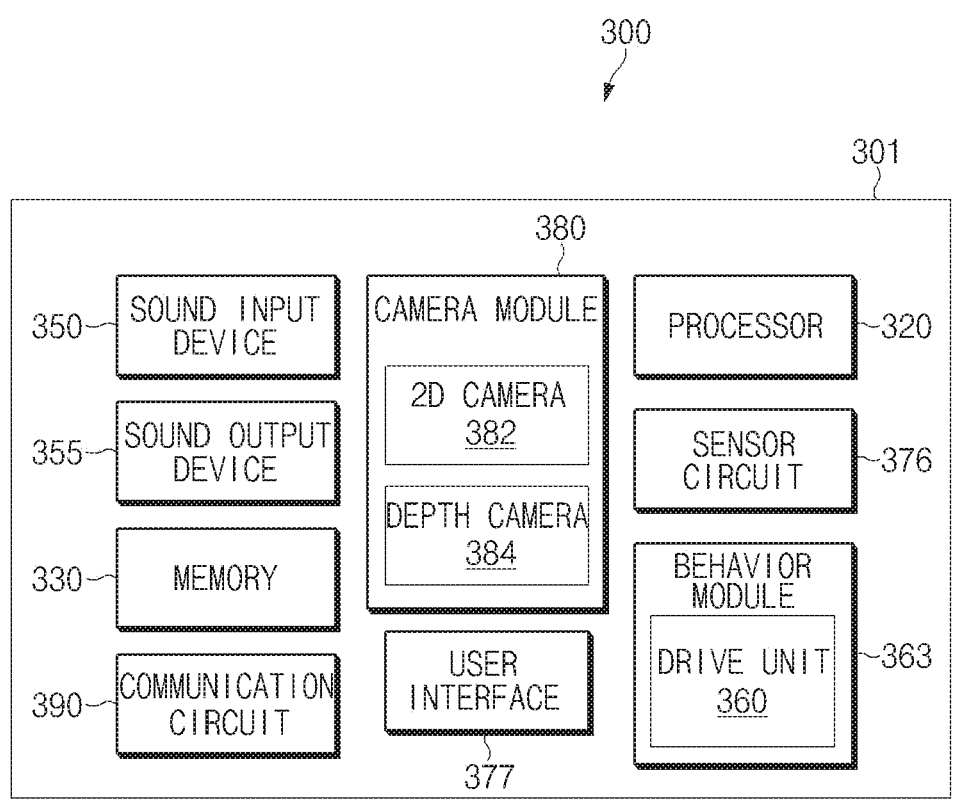
FIG. 3 illustrates a block diagram of the electronic device according to an embodiment of the disclosure.

FIG. 3 illustrates a block diagram of an electronic device according to an embodiment of the disclosure.

Referring to FIG. 3, as illustrated in a block diagram 300, according to various embodiments, an electronic device 301 (e.g., the electronic device 101 of FIG. 1) may include a processor 320 (e.g., the processor 120 of FIG. 1), a memory 330 (e.g., the memory 130 of FIG. 1), sound input device 350 (e.g., the input device 150 of FIG. 1), sound output device 355 (e.g., the sound output device 155 of FIG. 1), a behavior module 363, a sensor circuit 376 (e.g., the sensor module 176 of FIG. 1), a user interface 377, a camera module 380 (e.g., the camera module 180 of FIG. 1), and/or a communication circuit 390 (e.g., the communication module 190 of FIG. 1). For example, the electronic device 301 may include at least part of the configurations of FIG. 3 in the housing (not shown) forming at least part of the appearance of the electronic device 301. For another example, at least part of the configurations of the electronic device 301 of FIG. 3 may be viewable from the outside of the housing. The configurations of the electronic device 301 in FIG. 3 are an example, and embodiments of the disclosure are not limited thereto. For example, the electronic device 301 may further include at least one configuration not illustrated in FIG. 3. For example, the electronic device 301 may not include at least one configuration illustrated in FIG. 3. For example, the electronic device 301 may further include housing, a battery, and/or a power management circuit.

According to an embodiment, the electronic device 301 may include the housing (not illustrated), a user interface 377, a battery (not illustrated) positioned inside the housing, a driving unit (e.g., the drive unit 360) disposed in the housing or connected to the housing to move the housing, at least one sensor (e.g., the sensor circuit 376) positioned on or inside the housing or housing, a wireless communication circuit (e.g., the communication circuit 390) positioned inside the housing, a processor 320, and/or a memory 330. For example, the processor 320 may be operatively connected to the user interface 377, the driving unit, the sensor, and the wireless communication circuit. For example, the memory 330 may be operatively connected to the processor 320. The memory 330 may be operatively connected to the processor 320.

According to various embodiments, the processor 320 may include at least one processor. According to an embodiment, the processor 320 may include at least one processor for machine learning. According to an embodiment, the processor 320 may be electrically and/or operatively connected to other configurations of the electronic device 301. The processor 320 may perform various operations of the electronic device 301 to be described later. For example, the processor 320 may perform various operations of the electronic device 301 by controlling other configurations of the electronic device 301 based on instructions stored in the memory 330.

According to various embodiments, the memory 330 may be operatively connected to the processor and may store one or more instructions. For example, at least part of pieces of software described above with respect to FIG. 2 may be stored in memory 330.

According to various embodiments, the sound input device 350 may include at least one microphone. For example, the sound input device 350 may include at least one microphone array including a plurality of microphones. For example, the electronic device 301 may determine an utterance point based on the voice signal obtained using a plurality of microphones of the sound input device 350.

According to various embodiments, the sound output device 355 may include at least one speaker. For example, the electronic device 301 may output a voice, using a sound output device.

According to various embodiments, the camera module 380 may include at least one camera (e.g., a camera module including a lens and an image sensor). According to an embodiment, the camera module 380 may include a 2-dimensional (2D) camera 382 and a depth camera 384. For example, the 2D camera 382 may be a camera configured to obtain a 2D image. For example, the depth camera 384 may be a camera configured to obtain depth information. According to an embodiment, the electronic device 301 may perform object recognition, using the camera module 380. For example, the electronic device 301 may perform object recognition based at least on the image obtained by the 2D camera 382 and/or the depth camera 384.

According to various embodiments, the user interface 377 may include at least one input means for obtaining a user input and/or at least one output means for providing user feedback. According to an embodiment, the user interface 377 may include the sound input device 350, the sound output device 355, and/or the camera module 380. For example, the electronic device 301 may obtain a user input, using the sound input device 350. The electronic device 301 may provide the feedback on the user input, using the sound output device 355. According to an embodiment, the user interface 377 may include a display (e.g., the display device 160 of FIG. 1). For example, the display may receive a touch input. For example, the electronic device 301 may provide visual feedback corresponding to a user input by displaying an image on the display. According to an embodiment, the user interface 377 may include the camera module 380. For example, the electronic device 301 may obtain a user input, using the camera module 380.

According to various embodiments, the electronic device 301 may include the sensor circuit 376. For example, the sensor circuit 376 may include at least one sensor. The processor 320 may control the electronic device 301 based on information detected by the sensor circuit 376. For example, the processor 320 may navigate the electronic device 301 based at least partly on information detected by the sensor circuit 376.

According to various embodiments, the behavior module 363 may be configured to command the movement of the electronic device 301. For example, the behavior module 363 may include the drive unit 360. According to an embodiment, the behavior module 363 may perform facial expression changing expression, posture expression, and/or driving. According to an embodiment, the drive unit 360 may include a facial expression motor, a posture expression motor, and/or a driving unit. According to an embodiment, the facial expression motor may provide the visual feedback on the state of the electronic device 301 by controlling the configuration exposed to the outside of the electronic device 301. For example, the driving unit may be configured to mechanically change the movement and other components of the electronic device 301. According to an embodiment, the driving unit may be in the form in which the movement (e.g., up, down, left, and/or right) and/or rotation (e.g., clockwise and/or counterclockwise) about at least one or more axes is possible. For example, the driving unit may include a drive motor, a power transmission device, and/or a drive wheel (e.g., a wheel-type caster, a sphere-type caster, a continuous track, or a propeller). According to an embodiment, the posture expression motor may be configured to control at least one joint of the electronic device 301. For example, the electronic device 301 may control configurations such as arms, hands, legs, and/or feet of the electronic device 301, using the expression motor.

According to various embodiments, the communication circuit 390 may be configured to perform wireless communication and/or wired communication. For example, the electronic device 301 may transmit the obtain information (e.g., the obtained user input, a voice input, and/or an image) to the external electronic device, using the communication circuit 390 and may receive the result analyzed by the external electronic device, from the external electronic device.

According to various embodiments, the electronic device 301 may be a robot. For example, the electronic device 301 may be a robot having self-mobility. Hereinafter, various embodiments in which the electronic device 301 is utilized at home will be described. However, the application of the electronic device 301 is not limited to home use. The electronic device 301 may be a robot for various industrial purposes.

Figure 4:
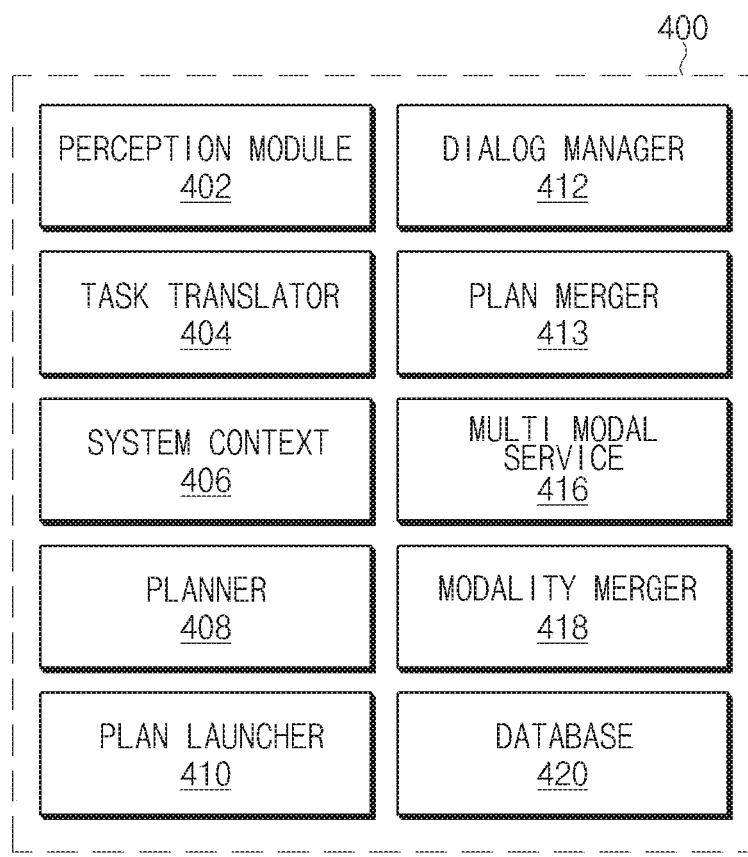
FIG. 4 illustrates a system structure of an electronic device according to an embodiment of the disclosure.

FIG. 4 illustrates a system structure of an electronic device according to an embodiment of the disclosure.

Referring to FIG. 4, as depicted in a system structure 400 according to various embodiments, the electronic device 301 may perform various tasks. For example, the task may be referred to as a "goal". The task may be an operation that is commanded or requested by the electronic device 301 within a limited environment. For example, the task may be a command or a request that is commanded by the user to the electronic device 301. According to an embodiment, the electronic device 301 may obtain a task from a user input. For example, the electronic device 301 may obtain a task from a voice input corresponding to a user utterance. For example, the electronic device 301 may obtain a task based on a voice input such as "bring a glass of water from the refrigerator" or "tell mom I'm hungry".

According to various embodiments, the electronic device 301 may perform a multi-modal task. For example, the electronic device 301 may perform a task through a plurality of modalities. For example, the modality may be referred to as a type of channel (e.g., a type of channel to which an input or an output is delivered) used for the interaction between the electronic device 301 and the external environment (e.g., a user). The multi-modal task may be referred to as a task requiring a plurality of modalities. For example, the voice utterances of the electronic device 301 may correspond to a single modality. For another example, the movement having the same destination and source of the electronic device 301 may correspond to a single modality.

According to various embodiments, the electronic device 301 may obtain at least one sub-task from a single task. For example, the electronic device 301 may classify at least one sub-task required to perform a task from a single task. For example, in the case of a task saying that "bring a glass of water from the refrigerator", for the purpose of performing the task, the electronic device 301 a) may find a cup, b) may hold the cup, c) may navigate to a refrigerator, d) may pour water into the cup, e) may hold the cup and may navigate to a user, and f) may deliver water to the user. In this case, the task corresponding to "bring a glass of water from the refrigerator" may be composed of a plurality of sub-tasks corresponding to at least a) to f). For example, the electronic device 301 may repeatedly perform one sub-task to perform a complex task. According to an embodiment, the sub-task may correspond to the minimum execution unit of the electronic device 301. For example, the unit of sub-task may be different depending on the setting of the electronic device 301. According to an embodiment, the electronic device 301 may perform the same or similar sub-task to execute different tasks. For example, when the first task of the first message delivery and the second task of the second message delivery are associated with the same target user, the electronic device 301 may perform similar sub-tasks corresponding to a voice output for the first message delivery and the second message delivery.

According to various embodiments, the electronic device 301 may classify sub-tasks based on a sub-task type. For example, each sub-task performed by the electronic device 301 may belong to the same type of a skill set of the electronic device. For example, the sub-task saying that "navigate to the refrigerator" and "navigate to the user" may be the same type of sub-task of "navigate". For example, the number of sub-task types may be limited depending on the configuration, limited functionality, or skill set of the electronic device 301. Because the electronic device 301 has the limited number of sub-task types, the electronic device 301 may perform a plurality of tasks more efficiently by merging plans at a sub-task level. For example, the sub-task type may include at least one of "navigation", "emotion detection", "item pick up", "object identification", and/or "searching". The type of sub-task is for description, and embodiments of the disclosure are not limited thereto.

According to various embodiments, the electronic device 301 may identify a plan for performing at least one task. For example, the plan may include at least one sequence of a plurality of sub-tasks for performing a task. For example, at least one sequence may have a graph form. According to an embodiment, the plan may consist of a plurality of nodes and a path connecting between nodes. For example, when a condition corresponding to the node of the plan is satisfied or met, the electronic device 301 may perform an operation of the condition corresponding to the next node along a path connected to the node. The electronic device 301 may perform a task by performing a series of operations along the nodes of the plan. For example, the electronic device 301 may determine a path (e.g., best path) between nodes. The operation in which the electronic device 301 determines the path may be referred to as "planning". The path in the graph for the plan may be referred to as a plan. Each plan in the graph for a plan may include the sequence of sub-tasks of a specific sub-task type. For example, each node in the plan may correspond to a single sub-task. Hereinafter, the node may be referred to as a "sub-task".

According to various embodiments, the electronic device 301 may include a perception module 402, a task translator 404, a system context 406, a planner 408, a plan launcher 410, a dialog manager 412, a plan merger 413, a multi modal service 416, a modality merger 418, and/or a database 420. For example, the components of the system structure 400 of the electronic device 301 may be a software module that is stored in a memory (e.g., the memory 330 of FIG. 3) of the electronic device 301 and is performed by a processor (e.g., the processor 320 of FIG. 3).

According to various embodiments, the electronic device 301 may receive a multi modal input, using the system structure 400 of FIG. 4 and may provide a multi modal output corresponding to the multi modal input. The system structure 400 of FIG. 4 is an example, and embodiments of the disclosure are not limited thereto. For example, a plurality of components among the components of the system structure 400 of FIG. 4 may be implemented as a single component. For example, the system structure 400 may further include a configuration not shown in FIG. 4. For example, the system structure 400 may not include at least one of the components illustrated in FIG. 4.

According to an embodiment, the perception module 402 may recognize an input (e.g., a multi modal input) obtained using various input devices (e.g., the sound input device 350, the sensor circuit 376, the user interface 377, and/or the camera module 380 of FIG. 3) of the electronic device 301. For example, the perception module 402 may perform inference, such as object detection, emotion detection, or the like on the obtained input. The perception module 402 may identify a semantic feature from the input through inference and may make decisions on a perception layer.

According to an embodiment, the task translator 404 may identify the task executed by the electronic device 301. For example, the task translator 404 may determine the final goal (e.g., a task), using the semantic feature and the decisions from the perception module 402.

According to an embodiment, the system context 406 may obtain and/or manage context information associated with the electronic device 301 and/or the environment of the electronic device 301. For example, the context information may be used in various decisions and/or inferences based on the electronic device 301, the environment of the electronic device 301, and/or a task.

According to an embodiment, the planner 408 may identify the plan for the identified task. For example, the planner 408 may identify a plan from a plan graph database of the database 420. The planner 408 may identify a path corresponding to the plan graph corresponding to the given information.

According to an embodiment, the plan launcher 410 may execute each node (e.g., a sub-task) in the plan graph. For example, the plan launcher 410 may use the multi modal service 416 to control various hardware configurations of the electronic device 301.

According to an embodiment, the dialog manager 412 may manage a dialog sequence. For example, the dialog manager 412 may integrate a plurality of dialog sequences to generate a single dialog. For example, the dialog may refer to the dialogue between the electronic device 301 and a user via a voice or other input/output means.

According to an embodiment, the plan merger 413 may merge a plurality of plans to identify the single merged plan. For example, the plan merger 413 may merge a plurality of plan graphs into a single plan graph. For example, the plan merger 413 may merge plans by combining plan graphs for various tasks. According to an embodiment, the plan merger 413 may identify the single merged plan from a plurality of merged plan assumptions. For example, the plan merger 413 may identify the single merged plan from a plurality of merged plan assumptions based on the loss score. According to an embodiment, the plan merger 413 may merge a plurality of sub-tasks depending on the identified merged plan.

According to an embodiment, the multi modal service 416 may provide an interface for controlling various hardware configurations of the electronic device 301. For example, the multi modal service 416 may provide the perception module 402 with the input obtained using at least one configuration of the electronic device 301. For another example, the multi modal service 416 may provide an output, using at least one configuration of the electronic device 301 depending on the instructions of the plan launcher.

According to an embodiment, the modality merger 418 may combine compatible modalities. For example, the plan merger 413 may combine similar types of modalities to provide seamless feedback to the user. For example, the electronic device 301 may need to provide the user with the feedback of two sentences saying that "Here is the watch you requested" and "Here is the wallet you requested". In this case, the modality merger 418 may convert the two sentences into a single sentence such as "Here is the watch and wallet you requested" by combining the two sentences.

For example, the modality merger 418 may allow at least part of a plurality of other tasks to be performed simultaneously by combining a similar type of modalities.

According to an embodiment, the database 420 may store plan graphs for various tasks capable of being performed by the electronic device 301. For example, the planner 408 may identify plan graphs that correspond to tasks, using plan graphs stored in the database 420. For another example, the database 420 may store a rule and/or a policy that allows the plan merger 413 to merge various tasks.

According to various embodiments, the electronic device 301 may optimize the plan graph at a sub-task level to generate the merged plan. For example, the electronic device 301 may optimize the plan graph by combining nodes corresponding to sub-tasks based on similarity and/or constraints. The merged plan generating method of the electronic device 301 will be described with reference to FIGS. 5 and 6.

Figure 5:
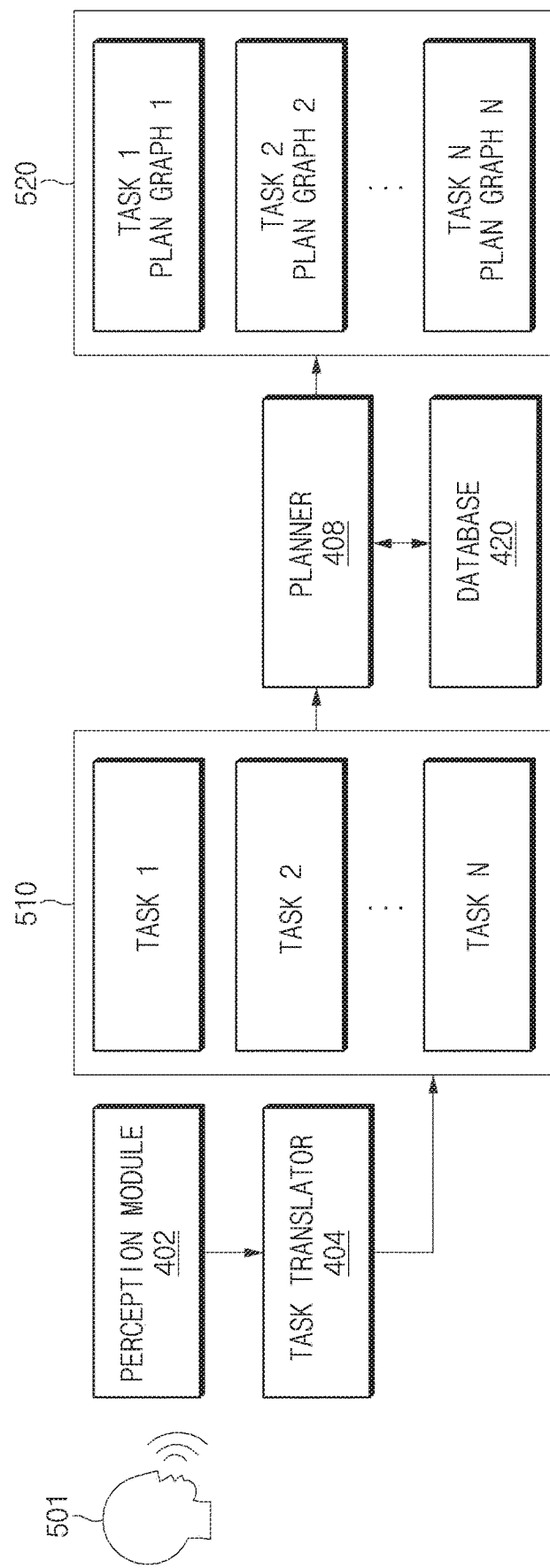
FIG. 5 illustrates a plan graph generating operation of an electronic device according to an embodiment of the disclosure.

FIG. 5 illustrates a plan graph generating operation of an electronic device according to an embodiment of the disclosure.

Referring to FIG. 5, according to various embodiments, the electronic device 301 may generate a plurality of tasks 510. According to an embodiment, the electronic device 301 may perform the semantic feature and decision from the input of a user 501, using the perception module 402 and may identify a task corresponding to the input, using the semantic feature and the decision using the task translator 404. For example, the electronic device 301 may generate the plurality of tasks 510 based on inputs from a plurality of users or may generate the plurality of tasks 510 based on a plurality of inputs of a single user. According to an embodiment, the electronic device 301 may generate the plurality of tasks 510 based on a specified schedule or an external signal. For example, the electronic device 301 may generate at least one task of the plurality of tasks 510 based on the task indicated by the external signal.

According to various embodiments, the electronic device 301 may identify a plurality of plan graphs 520 corresponding to the plurality of tasks 510 from the plurality of tasks 510. According to an embodiment, the planner 408 may identify the plurality of plan graphs 520 corresponding to the plurality of tasks 510, respectively. For example, the planner 408 may identify the plan graph corresponding to each task, using the plan graph stored in the database 420. For another example, the planner 408 may transmit the identified task information to an external electronic device and may receive plan graph information corresponding to the identified task information from the external electronic device.

Figure 6:
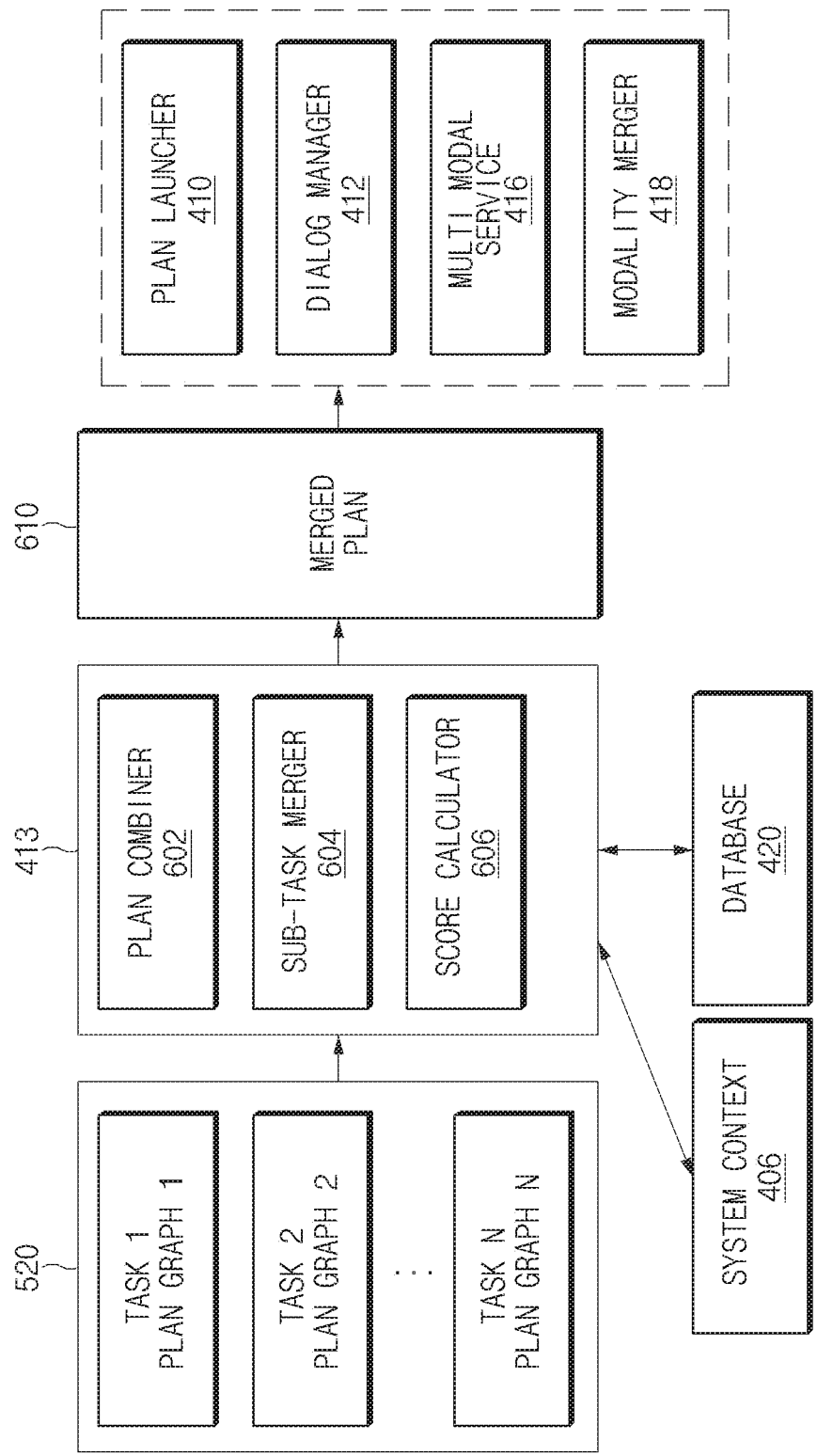
FIG. 6 illustrates a merged plan executing operation of an electronic device according to an embodiment of the disclosure.

FIG. 6 illustrates a merged plan executing operation of an electronic device according to an embodiment of the disclosure.

Referring to FIG. 6, according to various embodiments, the electronic device 301 may generate a merged plan 610 from the plurality of plan graphs 520. For example, the electronic device 301 may generate the merged plan 610 from the plurality of plan graphs 520, using the plan merger 413.

According to an embodiment, the plan merger 413 may include a plan combiner 602, a sub-task merger 604, and/or a score calculator 606.

According to various embodiments, the plan combiner 602 may merge the plurality of plan graphs 520 to generate a plurality of combined plans. For example, the plan combiner 602 may merge the plurality of plan graphs 520 to generate a plurality of combinations (e.g., combined plans). The plan combiner 602 may generate a plurality of combinations based on optimization, a sub-task type, and/or loss score calculation. For example, the plan combiner 602 may generate the specified number of combinations.

According to an embodiment, the plan combiner 602 may estimate the sub-sequence of sub-tasks. For example, the plan combiner 602 may identify the sub-sequence of similar sub-tasks between plans to be merged. For example, the plan combiner 602 may identify the longest sub-sequence among sub-sequences of similar sub-tasks that are common among the plans to be merged. For example, the length of sub-sequence may be identified depending on the number of sub-tasks included in the sub-sequence. For example, as the length of the sub-sequence of similar sub-tasks, which are common among the plans to be merged, increases, the plan combiner 602 may determine that the similarity between plans to be merged is higher. According to an embodiment, the plan combiner 602 may calculate the similarity between plans to be merged. For example, the calculated similarity may be used to merge plans.

According to an embodiment, the plan combiner 602 may perform plan permutation. For example, the plan combiner 602 may combine a plurality of plans based on the similarity. For example, the plan combiner 602 may combine a plurality of plan graphs based on the length of the sub-sequence of the similar sub-tasks, which are common. The plan combiner 602 may identify various plan layouts (e.g. merged plan graphs) by combining various plans. According to an embodiment, the plan combiner 602 may perform permutation on the plans to be merged and then may generate various merged plans with respect to the same group of plans. For example, the plan combiner 602 may identify plans to be merged, based on priority, plan similarity, task similarity, sub-task similarity, and/or sub-sequence similarity. The plan combiner 602 may perform plan permutation on the group of plans to be merged.

According to various embodiments, the sub-task merger 604 may determine the merging of sub-tasks based on sub-task compatibility. For example, the sub-task merger 604 may determine the merging of sub-tasks based on the type of sub-tasks included in each of the tasks. According to an embodiment, the sub-task merger 604 may merge a plurality of sub-tasks such that the plurality of sub-tasks are combined and then are performed. For example, the sub-task merger 604 may generate the decision node in a plan graph and may merge sub-tasks such that a plurality of sub-tasks are performed depending on the result of the decision node.

According to an embodiment, the sub-task merger 604 may identify sub-task compatibility. For example, the sub-task merger 604 may identify the compatibility between sub-tasks based on the type of sub-tasks. For example, the sub-task merger 604 may further identify the compatibility, further using context information and/or multi modal information. For example, the first plan and the second plan may identify the same type of sub-tasks called "navigation". However, the same type of sub-tasks may not be compatible with one another. For example, the first plan and the second plan may be compatible with each other, only when the source and destination of the navigation are the same as each other. Accordingly, the sub-task merger 604 may identify the compatibility between sub-tasks, further in consideration of not only the types of the sub-tasks but also the attributes of the sub-tasks (e.g., modal attribute, location attribute, and/or context attribute).

According to an embodiment, the sub-task merger 604 may merge sub-tasks, using the compatibility of sub-tasks. For example, the sub-task merger 604 may combine nodes (e.g., sub-tasks) in plan graphs. According to an embodiment, the sub-task merger 604 may generate at least one decision node to treat various errors and/or alternatives in the process of combining nodes. For example, the sub-task merger 604 may combine plan graphs such that the merged sub-tasks are differently performed based on the result of the decision node.

According to an embodiment, the sub-task merger 604 may merge modalities for an output depending on the merging of sub-tasks. For example, the sub-task merger 604 may merge the modalities of the merged sub-tasks based on the modalities of the merged sub-tasks. For example, the sub-task merger 604 may merge two similar activities of the delivery of object 'A' and the delivery of object 'B'. For example, the electronic device 301 may include the output of a voice saying that "Here is object 'A' you requested", as the sub-task of a task of the delivery of 'A'. For example, the electronic device 301 may include the output of a voice saying that "Here is object 'B' you requested", as the sub-task of a task of the delivery of 'B'. In this case, the sub-task merger 604 may merge the two voices having the same modality and then may generate a voice output such as "Here are objects 'A' and 'B' you requested". For example, the multi modal service 416 may output the voice of the merged modality. An embodiment is exemplified as modalities of the same type of the voice output are merged, but embodiments of the disclosure are not limited thereto.

According to various embodiments, the score calculator 606 may calculate the loss score from a plan graph (e.g., merged plan graph). For example, the score calculator 606 may calculate the loss score, using the loss score for each node. For example, the score calculator 606 may calculate the loss score, using the loss score for each sub-task stored in the database 420. According to an embodiment, the score calculator 606 may identify the loss score for each sub-task (e.g., node). For example, the score calculator 606 may identify the loss score of each sub-task, based on hardware costs and/or software costs (e.g. at least one of power consumption, execution time, and/or movement distance) for the performance of each sub-task. For example, the sub-task may be the navigation to a specific location. In this case, the hardware costs may occur due to the power consumption of a sensor and a driving unit. Moreover, the software costs may occur due to the processing for navigation. According to an embodiment, the score calculator 606 may identify the software and/or hardware costs from physical unit costs such as movement time and/or movement distance. According to an embodiment, the score calculator 606 may identify costs, using a weight. For example, the score calculator 606 may identify costs (e.g., software costs), using the weight set for the specific sub-task. According to an embodiment, the score calculator 606 may identify the loss score further based on a context input. For example, the score calculator 606 may calculate the loss score based on distance information obtained using context information such as the current location of the electronic device 301. For example, the score calculator 606 may obtain the context information from the system context 406.

According to various embodiments, the plan merger 413 may identify the merged plan 610 based on the loss score of the merged plan. For example, the plan merger 413 may identify the merged plan 610 having the lowest loss score among various plan combinations. The identified merged plan 610 may be delivered to the plan launcher 410. For example, the electronic device 301 may execute the merged plan 610, using various components (e.g., the plan launcher 410, the dialog manager 412, the multi modal service 416, and/or the modality merger 418).

The configurations of the electronic device 301 described above with reference with FIGS. 1 to 6 may be used in various environments. For example, the electronic device 301 may be used in various social environments such as a house, an office, a party, and a restaurant. In this case, parallel requests from a plurality of users may be received by the electronic device 301 at the same time. For example, when the electronic device 301 is used at home, the electronic device 301 may perform various errands such as bring a newspaper, bring milk, managing home appliance, and/or delivering a message. According to an embodiment, the electronic device 301 may be configured to perform a plurality of tasks at the same time. For example, the electronic device 301 may perform both a task of bringing milk at the front door and a task of a newspaper at the front door. For example, even though the two tasks are not instructed at the same time, for the purpose of reducing losses (e.g., power, or the like), the electronic device 301 may merge the two tasks to perform the merged tasks at the same time.

Figure 7:
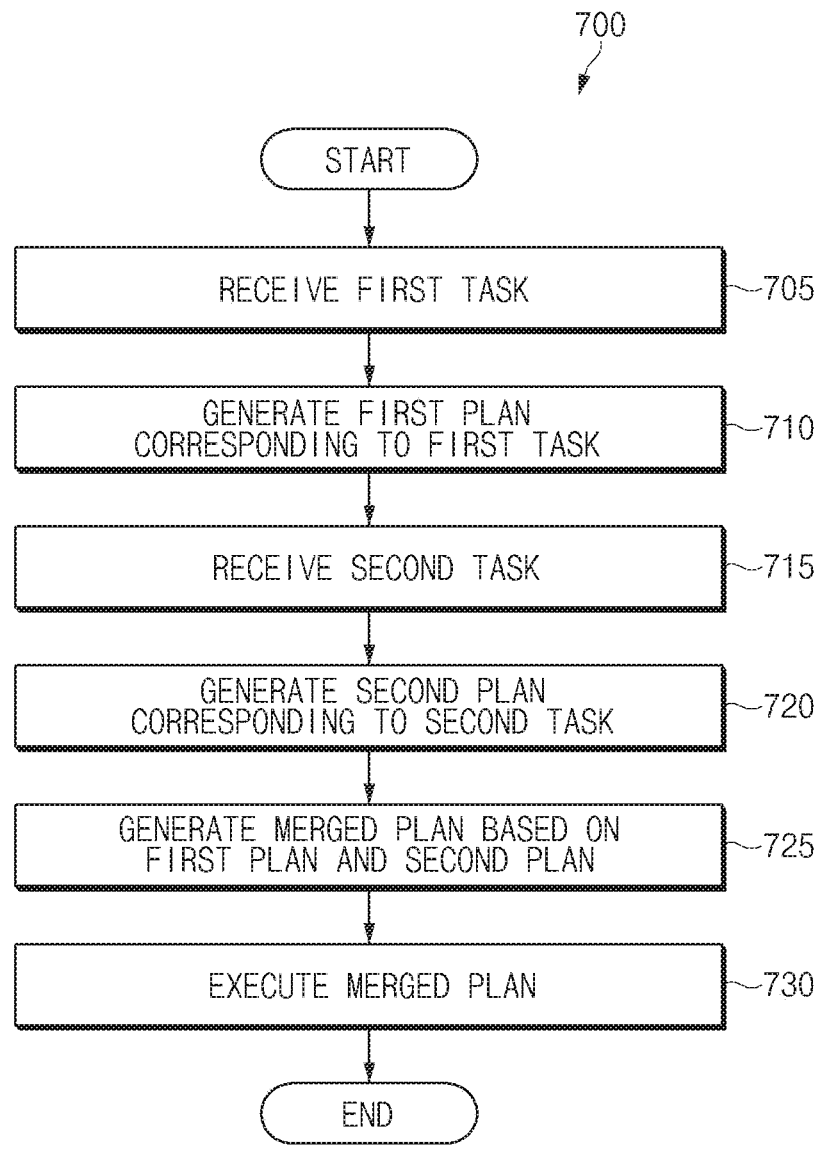
FIG. 7 is a flowchart of a method of executing a merged plan according to an embodiment of the disclosure.

FIG. 7 is a flowchart of a method of executing a merged plan according to an embodiment of the disclosure.

Referring to FIG. 7, as depicted in flowchart 700 according to various embodiments, in operation 705, the electronic device 301 may receive a first task. For example, the electronic device 301 may receive a first task, from the multi modal input and/or schedule from a user. According to an embodiment, the electronic device 301 may receive a multi modal input, using the sound input device 350, the camera module 380, the user interface 377, and/or the sensor circuit 376 of FIG. 3. According to an embodiment, the electronic device 301 may obtain schedule information from the schedule stored in the memory 330 of FIG. 3. According to an embodiment, the electronic device 301 may identify the first task from the received multi modal input and/or schedule, using the perception module 402 and/or the task translator 404 of FIG. 4.

According to various embodiments, in operation 710, the electronic device 301 may generate a first plan corresponding to the first task. According to an embodiment, the electronic device 301 may generate a first plan graph corresponding to the first task, using the planner 408 and the database 420 of FIG. 4. For example, the first plan may be represented as the first plan graph composed of a sequence including a plurality of nodes (e.g., sub-tasks).

According to various embodiments, in operation 715, the electronic device 301 may receive a second task. For example, the electronic device 301 may receive a second task, from the multi modal input and/or schedule from the user. According to an embodiment, the electronic device 301 may receive a multi modal input, using the sound input device 350, the camera module 380, the user interface 377, and/or the sensor circuit 376 of FIG. 3. According to an embodiment, the electronic device 301 may obtain schedule information from the schedule stored in the memory 330 of FIG. 3. According to an embodiment, the electronic device 301 may identify the second task from the received multi modal input and/or schedule, using the perception module 402 and/or the task translator 404 of FIG. 4.

According to various embodiments, in operation 720, the electronic device 301 may generate a second plan corresponding to the second task. According to an embodiment, the electronic device 301 may generate a second plan graph corresponding to the second task, using the planner 408 and the database 420 of FIG. 4. For example, the second plan may be represented as the second plan graph composed of a sequence including a plurality of nodes (e.g., sub-tasks).

An embodiment is exemplified in FIG. 7 as the first task is received before the second task, but embodiments of the disclosure are not limited thereto. The first task and the second task may be received substantially simultaneously. Operation 705 to operation 720 of the flowchart of FIG. 7 is an example indicating that the electronic device 301 is capable of generating a plurality of plans. The operation order of the electronic device 301 is not limited thereto.

According to various embodiments, in operation 725, the electronic device 301 may generate the merged plan based on the first plan and the second plan. For example, the electronic device 301 may generate the single merged plan from a plurality of plans, using the plan merger 413 of FIG. 4. For example, the electronic device 301 may generate the merged plan based on system context information and a specified rule. According to an embodiment, the electronic device 301 may combine a plurality of first plans and a plurality of second plans to generate the plurality of combined plans and then may perform a sub-task merging on the plurality of combined plans. After merging the sub-tasks, the electronic device 301 may generate the single merged plan based on the loss score for the plurality of combined plans.

According to various embodiments, in operation 730, the electronic device 301 may execute the merged plan. For example, the electronic device 301 may execute the merged plan by controlling various configurations of the electronic device 301 depending on the merged plan.

Figure 8:
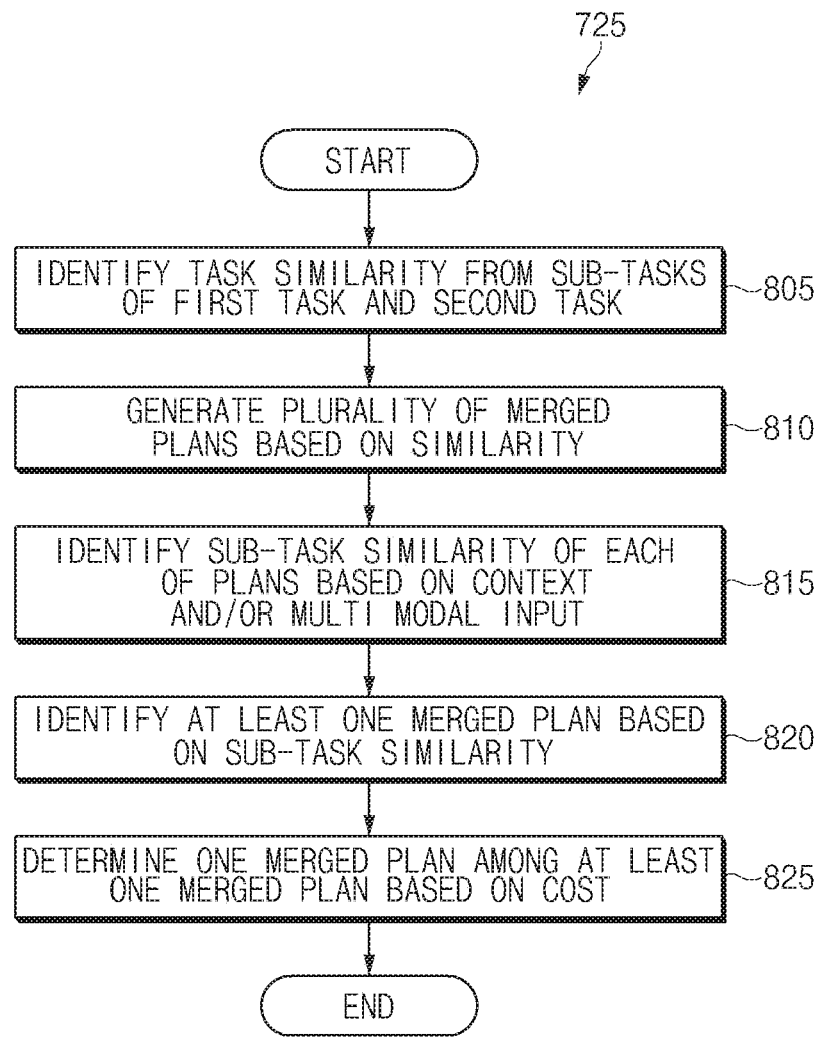
FIG. 8 is a flowchart of a method of generating a merged plan according to an embodiment of the disclosure.

FIG. 8 is a flowchart of a method of generating a merged plan according to an embodiment of the disclosure.

Referring to FIG. 8, the method of generating a merged plan may correspond to operation 725 of FIG. 7. For example, operations of FIG. 8 may be executed by the plan merger 413 of FIG. 4.

According to various embodiments, in operation 805, the electronic device 301 may identify task similarity from the sub-tasks of the first task and the second task. According to an embodiment, the electronic device 301 may identify the task similarity based on the similarity of sub-tasks between the first plan corresponding to the first task and the second plan corresponding to the second task. For example, the electronic device 301 may identify the similarity between the first task and the second task, based on the length (e.g., the number of nodes included in the common sub-sequence) of the longest common sub-sequence between the first plan and the second plan.

According to various embodiments, in operation 810, the electronic device 301 may generate a plurality of merged plans based on the similarity. For example, the plurality of merged plans may include the longest common sub-sequence between the first plan and the second plan. According to an embodiment, the electronic device 301 may generate the plurality of merged plans based on the similarity and a priority. For example, in the generating of the plurality of merged plans, the electronic device 301 may further consider the priorities of tasks. For example, the first task may have a higher priority than the second task. In this case, the electronic device 301 may generate the plurality of merged plans such that the first task is capable of being completed earlier.

According to various embodiments, in operation 815, the electronic device 301 may identify sub-task similarity of each of plans (e.g., the first plan and the second plan) based on a context and/or a multi modal input. For example, the electronic device 301 may identify the sub-task similarity based on the type of the sub-task and/or the attribute of the sub-task.

According to various embodiments, in operation 820, the electronic device 301 may identify at least one merged plan based on the sub-task similarity. For example, the electronic device 301 may identify the remaining at least one merged plan other than plans, which are obtained by merging sub-tasks incapable of being merged based on sub-task similarity, from among a plurality of merged plans. For example, at least part of a plurality of merged plans generated in operation 810 may include the merging of sub-tasks incapable of being merged based on the similarity. In this case, the electronic device 301 may identify at least one merged plan including only the merging of sub-tasks capable of being merged among the plurality of merged plans.

According to various embodiments, in operation 825, the electronic device 301 may determine one merged plan among at least one merged plan based on a cost. For example, the electronic device 301 may identify a cost (e.g., loss score) for the at least one merged plan. According to an embodiment, the electronic device 301 may determine that a merged plan having the lowest cost among the at least one merged plan is the merged plan.

Figure 9:
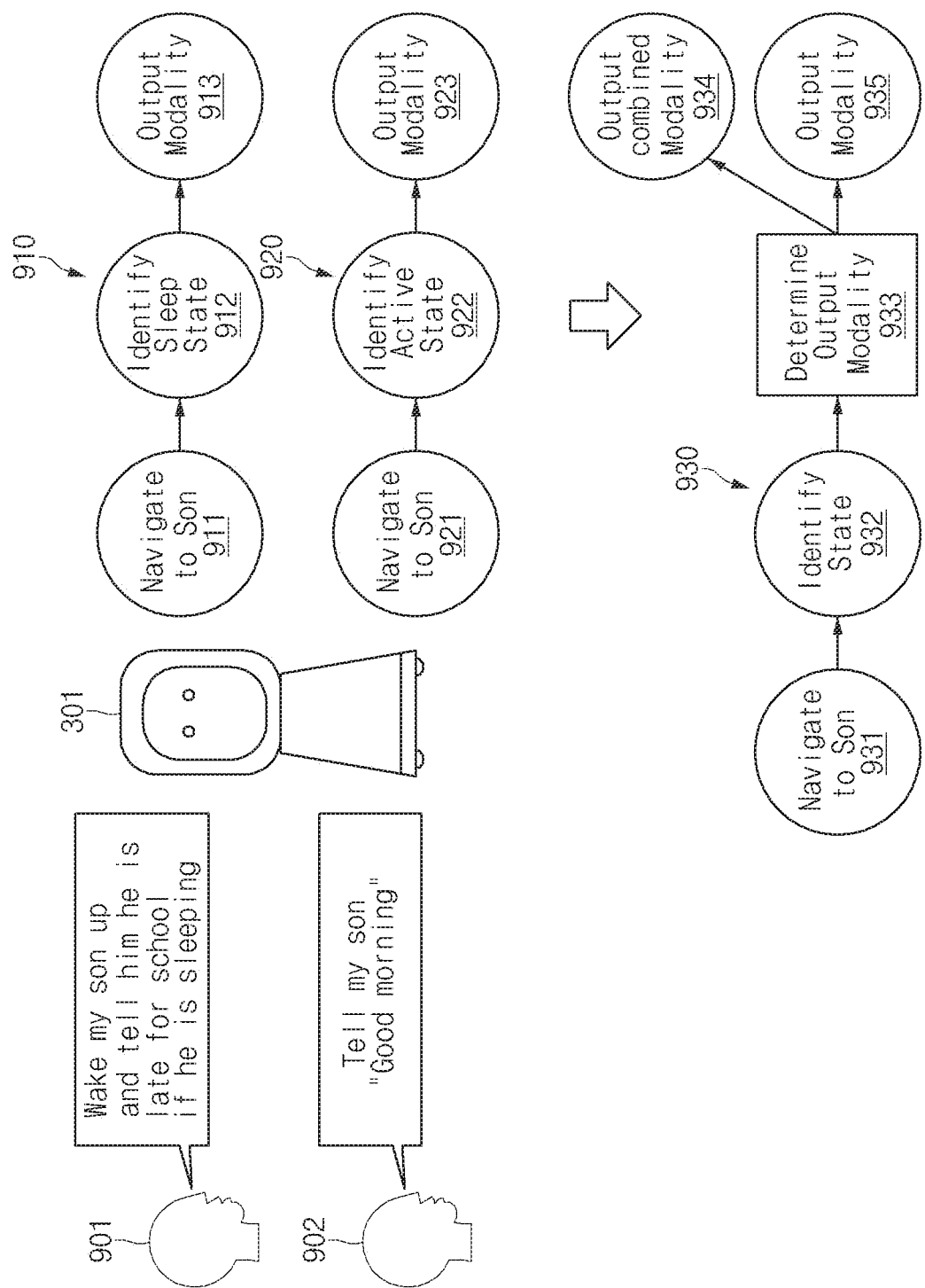
FIG. 9 illustrates an example of a method of generating a merged plan according to an embodiment of the disclosure.

FIG. 9 illustrates an example of a method of generating a merged plan according to an embodiment of the disclosure.

Referring to FIG. 9, a father 901 may instruct the electronic device 301 "If he is sleeping, wake my son up and tell him he is late for school". A mother 902 may instruct the electronic device 301 "tell my son good morning". For example, it may be assumed that the father 901 and the mother 902 are in the same place (e.g., house) as the son (not illustrated).

According to various embodiments, the electronic device 301 may generate a first plan 910 and a second plan 920 based on inputs from the father 901 and the mother 902. For example, the first plan 910 corresponding to the instruction of the father 901 may include a first node 911 corresponding to "navigate to the son", a second node 912 of identifying a sleep state, and a third node 913 corresponding to the output (e.g., outputting of the sound for waking up the son and the directed message) of the directed modality. For example, the second plan 920 corresponding to the instruction of the mother 902 may include a first node 921 corresponding to "navigate to the son", a second node 922 of identifying an active state, and a third node 923 corresponding to the output (e.g., outputting of the directed message) of the directed modality.

According to an embodiment, the electronic device 301 may identify the similarity between sub-tasks of the first plan 910 and sub-tasks of the second plan 920. For example, the first node 911 of the first plan 910 and the first node 921 of the second plan 920 may have high similarity, as nodes corresponding to sub-tasks having the same attribute (e.g., destination) and type (e.g., navigation). For another example, the second node 912 of the first plan 910 and the second node 922 of the second plan 920 may have high similarity, as nodes corresponding to the same sub-task having the same type (e.g., state identification). For still another example, the third node 913 of the first plan 910 and the third node 923 of the second plan 920 may have high similarity as nodes corresponding to the same sub-task having the same type (e.g., modality of the same type) and attribute (e.g., target (son)).

According to an embodiment, the electronic device 301 may merge sub-tasks with high similarity. For example, the electronic device 301 may merge the first node 911 of the first plan 910 and the first node 921 of the second plan 920 to generate the first node 931 of the merged plan 930. In this case, because at least part of the navigation paths corresponding to the first node 911 of the first plan and the first node 921 of the second plan overlap with each other, the electronic device 301 may merge the first node 911 of the first plan 910 and the first node 921 of the second plan 920. For another example, the electronic device 301 may merge the second node 912 of the first plan 910 and the second node 922 of the second plan 920 to generate the second node 932 of the merged plan 930. In this case, the electronic device 301 may merge the sleep state and the active state to identify the state of the son.

According to an embodiment, in the merging of sub-tasks, the electronic device 301 may add a decision node 933. For example, in the merging of the third node 913 of the first plan 910 and the third node 923 of the second plan 920, the electronic device 301 may add the decision node 933 for determining the modality to be output. For example, when it is determined, at the decision node 933, that the son is sleeping, the electronic device 301 may output the merged modality depending on a fourth node 934. In this case, the electronic device 301 may outputs a modality (e.g., alarm sound) for waking the son up and may output, to the son, the merged modality saying that "You are late for school. Mother wants to tell you good morning". For another example, when it is determined, at the decision node 933, that the son is awake, the electronic device 301 may output the modality depending on a fifth node 935. In this case, the electronic device 301 may output the modality saying that "Mother wants to tell you good morning".

In the exemplification of FIG. 9, because the first plan 910 and the second plan 920 are composed of a sequence of sub-tasks of substantially the same type, the electronic device 301 may generate the single merged plan. In various embodiments, the electronic device 301 may be configured to merge more complex plans.

Figure 10:
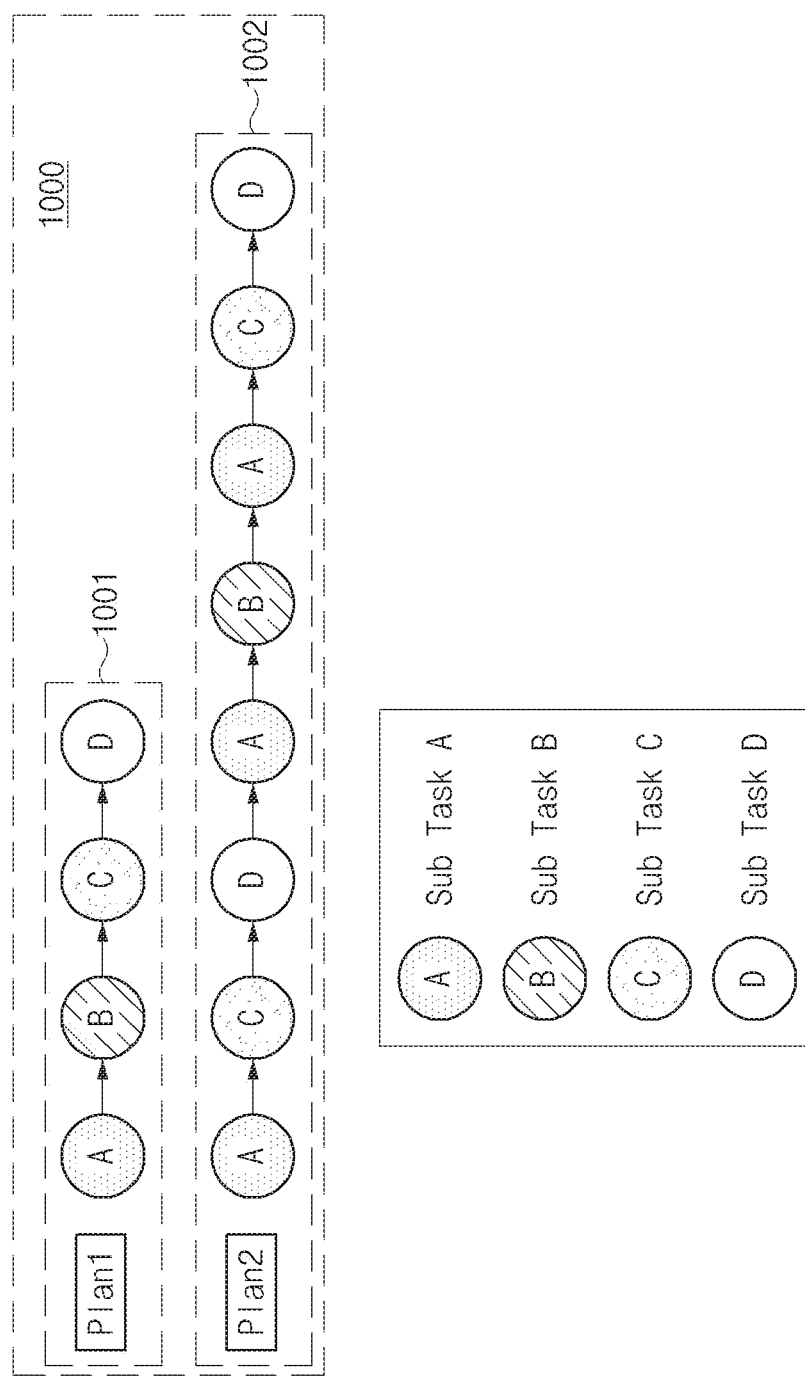
FIG. 10 illustrates plans according to an embodiment of the disclosure.

FIG. 10 illustrates plans according to an embodiment of the disclosure.

Figure 11:
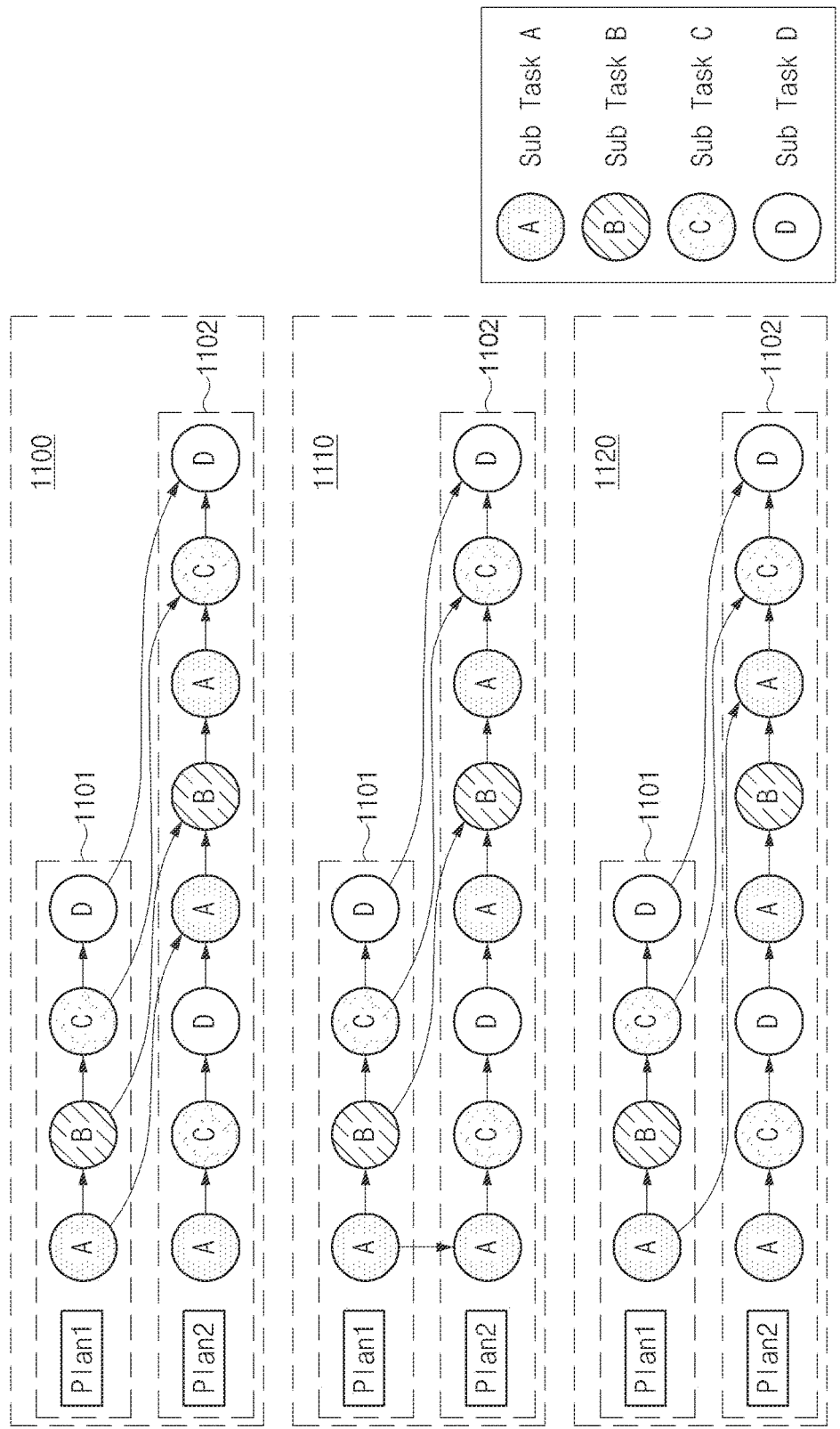
FIG. 11 illustrates various merged examples of the plans of FIG. 10 according to an embodiment of the disclosure.

FIG. 11 illustrates various merged examples of the plans of FIG. 10 according to an embodiment of the disclosure.

Hereinafter, methods of merging plans will be described with reference to FIGS. 10 and 11.

Referring to reference numeral 1000, the electronic device 301 may identify a first plan 1001 and a second plan 1002. For example, the electronic device 301 may generate a plurality of merged plans from the first plan 1001 and the second plan 1002. Referring to FIGS. 10 and 11, sub-task A, sub-task B, sub-task C, and sub-task D may correspond to different types of sub-tasks, respectively. For convenience of description, it may be assumed that sub-tasks of the same type are sub-tasks capable of being merged. According to an embodiment, the electronic device 301 may merge the first plan 1101 and the second plan 1102 to identify a first merging plan 1100, a second merging plan 1110, and a third merging plan 1120.

According to various embodiments, the electronic device 301 may identify one merged plan among a plurality of merged plans based on the loss score. For example, the electronic device 301 may identify the second merge plan 1110 as one merged plan based on the loss score.

Figure 12:
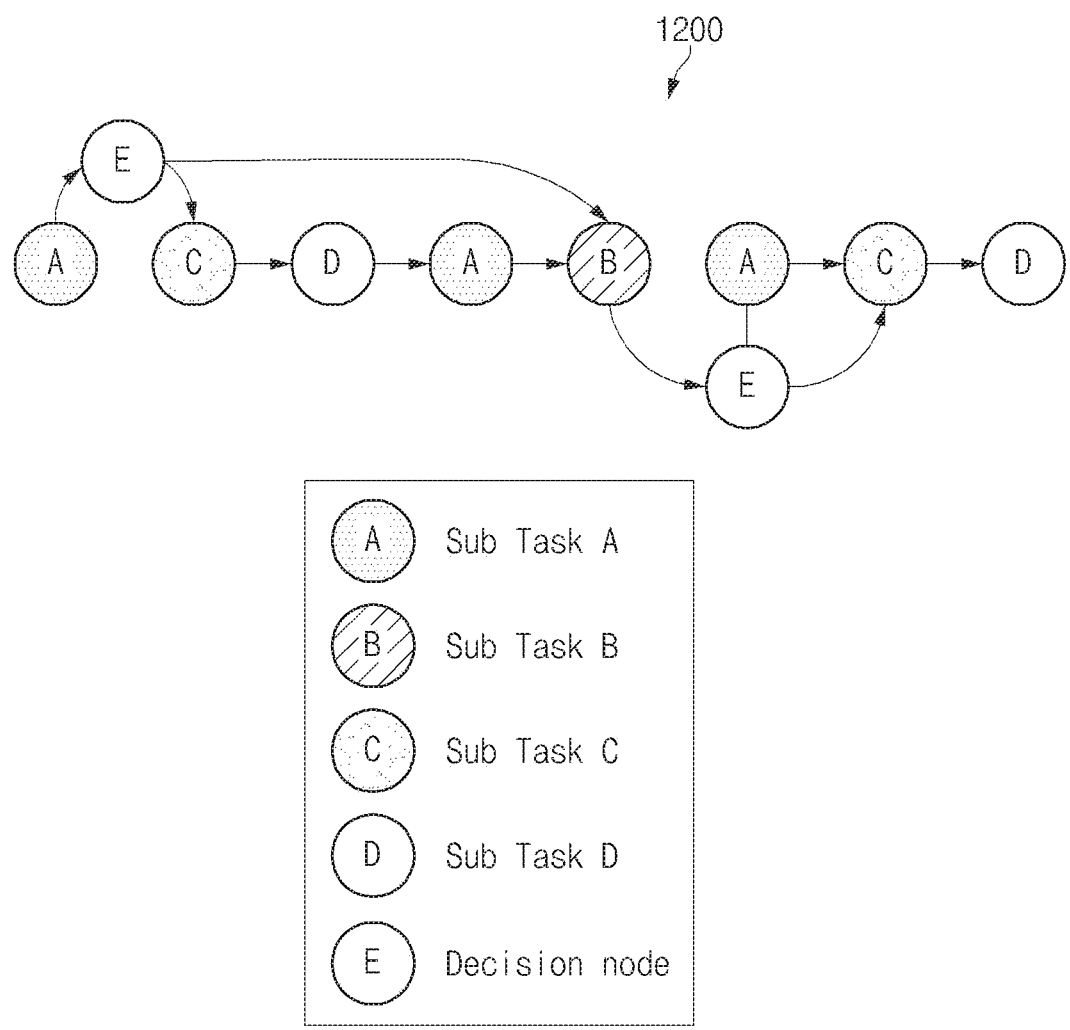
FIG. 12 illustrates a merged plan generated from the plans of FIG. 10 according to an embodiment of the disclosure.

FIG. 12 illustrates a merged plan generated from the plans of FIG. 10 according to an embodiment of the disclosure.

Referring to FIG. 12, for example, the merged plan 1200 of FIG. 12 may be the merged plan generated depending on the second merging plan 1110 of FIG. 11. According to various embodiments, in the generating of the merged plan 1200, the electronic device 301 may add at least one decision node. For example, in the merged plan 1200 of FIG. 12, after performing the merged sub-task 'A' corresponding to the first node, the electronic device 301 may proceed to the sub-task 'B' corresponding to the second node of the first plan 1001 or may proceed to sub-task C corresponding to the second node of the second plan 1002, depending on the decision of the decision node. Accordingly, in sub-task merging, the execution of at least part of the existing plans may be omitted.

Figure 13:
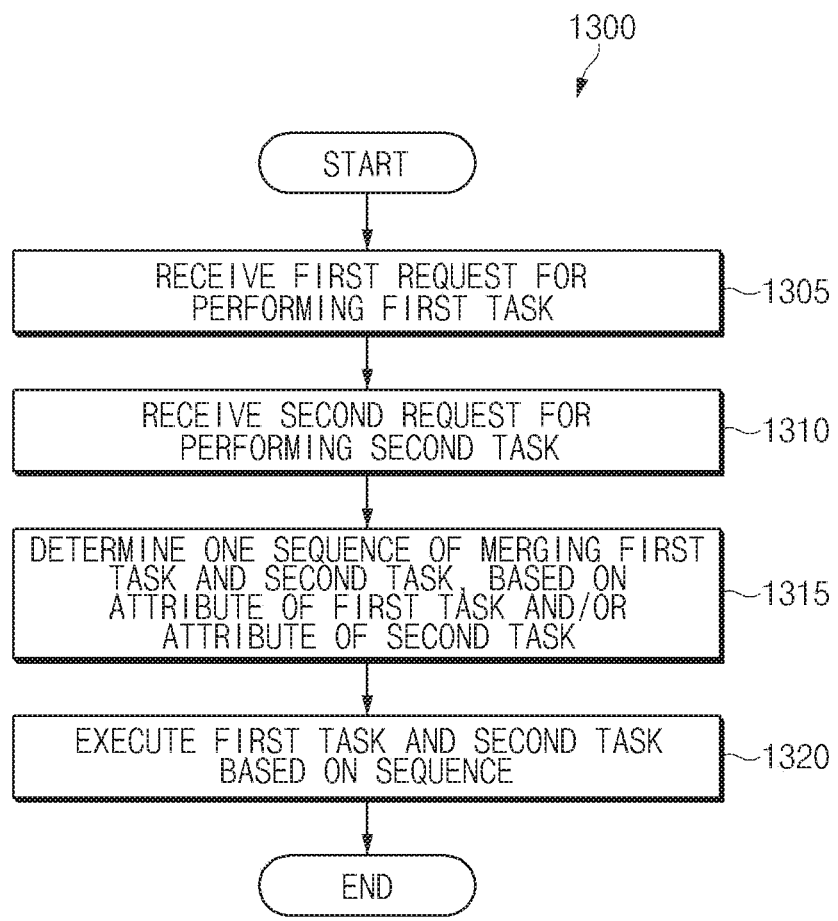
FIG. 13 is a flowchart of a method of executing a merged plan according to an embodiment of the disclosure.

FIG. 13 is a flowchart of a method of executing a merged plan according to an embodiment of the disclosure.

Referring to FIG. 13, as depicted in the flowchart 1300, according to various embodiments, the electronic device 301 may include housing, a user interface (e.g., the user interface 377 of FIG. 3), a battery (e.g., the battery 189 of FIG. 1) positioned inside the housing, a driving unit (e.g., the drive unit 360 of FIG. 3) disposed in the housing or connected to the housing to move the housing, at least one sensor positioned at the housing or inside the housing, a wireless communication circuit (e.g., the communication circuit 390 of FIG. 3) positioned inside the housing, a processor (e.g., the processor 320 of FIG. 3) operatively connected to the user interface, the driving unit, the at least one sensor, and the wireless communication circuit, and a memory (e.g., the memory 330 of FIG. 3) operatively connected to the processor. For example, the memory may store instructions that, when executed, cause the processor to perform the operations to be described.

According to various embodiments, in operation 1305, the electronic device 301 may receive a first request for performing a first task. According to an embodiment, the electronic device 301 may obtain a first request based on the input and/or schedule from the user. For example, the electronic device 301 may receive the first request through a user interface. For another example, the electronic device 301 may receive the first request through a wireless communication circuit.

According to various embodiments, in operation 1310, the electronic device 301 may receive a second request for performing a second task. For example, the electronic device 301 may receive the second request after receiving the first request. For example, the second task may be a task different from the first task performed within the selected time and/or the place of the selected range. According to an embodiment, the electronic device 301 may obtain the second request based on the input and/or schedule from the user. For example, the electronic device 301 may receive the second request through the user interface. For another example, the electronic device 301 may receive the second request through the wireless communication circuit.

According to various embodiments, in operation 1315, the electronic device 301 may determine a sequence of merging the first task and the second task, based on the attribute of the first task and/or the attribute of the second task. For example, the attribute of a task may include at least one of the type, execution target, execution time, and/or execution location of a task. According to an embodiment, the electronic device 301 may determine one sequence for connecting or merging the first task and the second task, based on at least part of the attributes of the first task and at least part of the attributes of the second task.

For example, the first task may include a sequence of first sub-tasks; the second task may include a sequence of second sub-tasks.

According to various embodiments, in operation 1320, the electronic device 301 may execute the first task and the second task based on the sequence.

According to various embodiments, the electronic device 301 may include housing, a user interface (e.g., the user interface 377 of FIG. 3), a battery (e.g., the battery 189 of FIG. 1) positioned inside the housing, a driving unit (e.g., the drive unit 360 of FIG. 3) disposed in the housing or connected to the housing to move the housing, at least one sensor positioned at the housing or inside the housing, a wireless communication circuit (e.g., the communication circuit 390 of FIG. 3) positioned inside the housing, a processor (e.g., the processor 320 of FIG. 3) operatively connected to the user interface, the driving unit, the at least one sensor, and the wireless communication circuit, and a memory (e.g., the memory 330 of FIG. 3) operatively connected to the processor. For example, the memory may store instructions that, when executed, cause the processor to perform the operations to be described. According to an embodiment, at least part of the configurations of the above-described electronic device 301 may be implemented by a plurality of electronic devices. In this case, the configurations of the above-described electronic device 301 may constitute a system including a plurality of electronic devices and performing a task.

According to an embodiment, the memory may store instructions that, when executed, cause the processor to receive a first request of a user for performing a first task, to receive a second request of the user for performing a second task different from the first task within a selected time and/or a place in a selected range after receiving the first request, to determine one sequence performed by connecting or merging the first task and the second task, based at least partly on at least one of a type, execution target, execution time, or execution location of the first task and at least one of a type, execution target, execution time, or execution location of the second task, and to perform the first task and the second task based at least partly on the sequence.

According to an embodiment, the instructions, when executed, may cause the processor to receive the first request and the second request through the user interface.

According to an embodiment, the instructions, when executed, may cause the processor to receive the first request and second request through the wireless communication circuit. For example, the first task may include a first sequence of first sub-tasks; the second task may include a second sequence of second sub-tasks. For example, each of the first sub-tasks and the second sub-tasks may correspond to a pre-defined sub routine unit capable of being performed by the electronic device.

According to an embodiment, the instructions, when executed, may cause the processor to merge at least part of the first sequence and at least part of the second sequence, based on similarity between at least part of the first sub-tasks and at least part of the second sub-tasks.

According to an embodiment, the instructions, when executed, may cause the processor to identify the similarity based on types and attributes of at least part of the first sub-tasks and at least part of the second sub-tasks.

According to an embodiment, the instructions, when executed, may cause the processor to perform sub-task merging on at least part of the first sub-tasks and at least part of the second sub-tasks, based on the identified similarity.

According to an embodiment, the instructions, when executed, may cause the processor to determine a plurality of sequences performed by connecting or merging the first task and the second task, to identify a cost for the plurality of sequences, and to determine the one sequence based on the identified cost.

According to an embodiment, the instructions, when executed, may cause the processor to identify the cost based on a hardware cost and a software cost for each of the plurality of sequences.

In various embodiments in the specification, an electronic device may perform multi tasks by merging tasks.

According to various embodiments disclosed in the specification, various requests of users may be performed.

According to various embodiments disclosed in the specification, the electronic device may reduce battery consumption and task execution time.

According to various embodiments disclosed in the specification, the electronic device may provide a method of performing multi-tasks by merging tasks at a sub-task level.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. service robot comprising:
a housing;
a user interface;
a battery positioned inside the housing;
a driving unit disposed at the housing or connected to the housing to move the housing;
at least one sensor positioned at the housing or inside the housing;
a wireless communication circuit positioned inside the housing;
a processor operatively connected to the user interface, the driving unit, the at least one sensor, and the wireless communication circuit; and
a memory operatively connected to the processor,
wherein the memory stores instructions that, when executed, cause the processor to:
receive a first request of a user for performing a first task,
after receiving the first request, receive a second request of the user for performing a second task, different from the first task, within at least one of a selected time and a place in a selected range, wherein the first task includes first sub-tasks, and the second task includes second sub-tasks, each of the first sub-tasks and the second sub-tasks corresponding to a pre-defined sub routine,
determine a plurality of merged sequences performed by connecting or merging the first task and the second task, based at least partly on at least one of a type, execution target, execution time, or execution location of the first task and at least one of a type, execution target, execution time, or execution location of the second task,
identify at least one merged sequence including merging of sub-tasks capable of being merged and not including merging of sub-tasks incapable of being merged among the plurality of merged sequences, based on at least one of a type, execution target, execution time, or execution location of the first sub-tasks and at least one of a type, execution target, execution time, or execution location of the second sub-tasks, identify a cost, based on at least one of a hardware cost or a software cost, for the at least one merged sequence, determine a final sequence based on the identified cost, and perform the first task and the second task based at least partly on the final sequence, and wherein the performing of at least one of the first task or the second task comprises moving the service robot via the driving unit based on the final sequence.

2. The service robot of claim 1, wherein the instructions, when executed, further cause the processor to:

receive the first request and the second request through the user interface.

3. The service robot of claim 1, wherein the instructions, when executed, further cause the processor to:

receive the first request and the second request through the wireless communication circuit.

4. The service robot of claim 1, wherein the first task includes a first sequence of the first sub-tasks, and wherein the second task includes a second sequence of the second sub-tasks.

5. The service robot of claim 1, wherein the instructions, when executed, further cause the processor to:

merge at least part of a first sequence and at least part of a second sequence, based on similarity between at least part of the first sub-tasks and at least part of the second sub-tasks.

6. The service robot of claim 5, wherein the instructions, when executed, further cause the processor to:

identify the similarity based on types and attributes of the at least part of the first sub-tasks and the at least part of the second sub-tasks.

7. The service robot of claim 6, wherein the instructions, when executed, further cause the processor to:

perform sub-task merging on the at least part of the first sub-tasks and the at least part of the second sub-tasks, based on the identified similarity.

8. A method for performing a task of a service robot, the service robot including a housing, a user interface, a battery positioned inside the housing, a driving unit disposed at the housing or connected to the housing to move the housing, at least one sensor positioned at the housing or inside the housing, a wireless communication circuit positioned inside the housing, a processor operatively connected to the user interface, the driving unit, the at least one sensor, and the wireless communication circuit, and a memory operatively connected to the processor, the method comprising:

receiving, using the processor, a first request associated with a first task and after receiving the first request receiving a second request associated with a second task different from the first task, the second request received within at least one of a selected time and a place in a selected range, wherein the first task includes first sub-tasks, and the second task includes second sub-tasks, each of the first sub-tasks and the second sub-tasks corresponding to a pre-defined sub routine;

determining, by the processor, a plurality of merged sequences performed by connecting or merging the first task and the second task, based on at least one of a type, execution target, execution time, or execution location of the first task and at least one of a type, execution target, execution time, or execution location of the second task;

identifying, by the processor, at least one merged sequence including merging of sub-tasks capable of being merged and not including merging of sub-tasks incapable of being merged among the plurality of merged sequences, based on at least one of a type, execution target, execution time, or execution location of the first sub-tasks and at least one of a type, execution target, execution time, or execution location of the second sub-tasks;

identifying, by the processor, a cost, based on at least one of a hardware cost or a software cost, for the at least one merged sequence;

determining, by the processor, a final sequence based on the identified cost; and performing, by the service robot, the first task and the second task based at least partly on the final sequence, wherein the performing of at least one of the first task or the second task comprises moving the service robot via the driving unit based on the final sequence.

9. The method of claim 8, wherein the receiving of the first request and the second request includes:

receiving the first request and the second request through an user interface of the service robot.

10. The method of claim 8, wherein the receiving of the first request and the second request includes:

receiving the first request and the second request through the wireless communication circuit of the service robot.

11. The method of claim 8, wherein the first task includes a first sequence of the first sub-tasks, and wherein the second task includes a second sequence of the second sub-tasks.

12. The method of claim 11, wherein the determining of the plurality of merged sequences performed by connecting or merging the first task and the second task comprises:

merging at least part of the first sequence and at least part of the second sequence, based on similarity between at least part of the first sub-tasks and at least part of the second sub-tasks.

13. A service robot for performing a task, the service robot comprising:

a housing;

a user interface;

a battery positioned inside the housing;

a driving unit disposed at the housing or connected to the housing to move the housing;

at least one sensor positioned at the housing or inside the housing;

at least one communication circuit;

at least one processor operatively connected to the user interface, the driving unit, the sensor, and the communication circuit; and at least one memory operatively connected to the at least one processor, wherein the memory stores instructions that, when executed, cause the at least one processor to:

receive a first request of a user for performing a first task, after receiving the first request, receive a second request of the user for performing a second task different from the first task, wherein the first task includes first sub-tasks, and the second task includes second sub-tasks, each of the first sub-tasks and the second sub-tasks corresponding to a pre-defined sub routine, determine a plurality of merged sequences performed by connecting or merging the first task and the second task, based at least partly on at least one of a type, execution target, execution time, or execution location of the first task and at least one of a type, execution target, execution time, or execution location of the second task, identify at least one merged sequence including merging of sub-tasks capable of being merged and not including merging of sub-tasks incapable of being merged among the plurality of merged sequences, based on at least one of a type, execution target, execution time, or execution location of the first sub-tasks and at least one of a type, execution target, execution time, or execution location of the second sub-tasks, identify a cost, based on at least one of a hardware cost or a software cost, for the at least one merged sequence, determine a final sequence based on the identified cost, and perform the first task and the second task based at least partly on the final sequence, wherein the performing of at least one of the first task or the second task comprises moving the service robot via the driving unit based on the final sequence.

14. The service robot of claim 13, wherein the instructions, when executed, further cause the at least one processor to:
receive the first request and the second request through the user interface.

15. The service robot of claim 13, wherein the instructions, when executed, further cause the processor to:
receive the first request and the second request through the communication circuit.

16. The service robot of claim 13,
wherein the first task includes a first sequence of the first sub-tasks, and
wherein the second task includes a second sequence of the second sub-tasks.

17. The service robot of claim 16, wherein the instructions, when executed, further cause the processor to:
merge at least part of the first sequence and at least part of the second sequence, based on similarity between at least part of the first sub-tasks and at least part of the second sub-tasks.

* * * * *